(12) United States Patent
Lin et al.

(10) Patent No.: US 8,496,425 B2
(45) Date of Patent: Jul. 30, 2013

(54) RECONFIGURABLE END-EFFECTORS WITH ARTICULATING FRAME AND INDEXABLE MASTER BOOM

(75) Inventors: Yhu-Tin Lin, Rochester Hills, MI (US); Andrew L. Bartos, Clarkston, MI (US); Roland J. Menassa, Macomb, MI (US); Douglas R. Black, New Baltimore, MI (US); Joseph J. Ekl, Jr., Rochester, MI (US); Mark A. Cline, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 912 days.

(21) Appl. No.: 12/626,993

(22) Filed: Nov. 30, 2009

(65) Prior Publication Data

US 2010/0140969 A1   Jun. 10, 2010

Related U.S. Application Data

(60) Provisional application No. 61/120,368, filed on Dec. 5, 2008.

(51) Int. Cl.
*B25J 17/02* (2006.01)
*B25J 15/06* (2006.01)
*B66F 9/00* (2006.01)

(52) U.S. Cl.
USPC ............ 414/729; 414/680; 414/737; 901/30; 901/40; 294/65; 192/223

(58) Field of Classification Search
USPC ......... 414/680, 729, 737; 901/30, 40; 294/65; 33/645; 192/223, 223.1
See application file for complete search history.

(56) References Cited

U.S. PATENT DOCUMENTS

| | | | |
|---|---|---|---|
| 4,685,714 A * | 8/1987 | Hoke | 294/81.2 |
| 5,735,200 A | 4/1998 | Tomei et al. | |
| 6,244,814 B1 * | 6/2001 | Herbermann et al. | 414/752.1 |
| 7,309,204 B2 * | 12/2007 | Dorner et al. | 414/737 |
| 7,404,475 B2 * | 7/2008 | Scheck et al. | 192/223 |
| 2003/0177656 A1 | 9/2003 | Sawdon | |
| 2006/0239809 A1 * | 10/2006 | DeSilvio | 414/680 |

FOREIGN PATENT DOCUMENTS

DE    29706038 U1    8/1998

OTHER PUBLICATIONS

Formsprag, Overrunning Indexing Backstopping Clutches, Formsprag LLC, 2006, See, pp. 54, 55.

* cited by examiner

*Primary Examiner* — Scott Lowe (57) ABSTRACT

The end-effector includes an articulating frame mounted on an indexable boom. Tool modules mount on the end-effector and connect to a workpiece. Each tool module includes a flexible dress package including a cable carrier. A channel rail is supported by the end-effector frame and guides the cable carrier. A setup tool and associated process can reconfigure the positions of the tool modules and the frame and boom of the end-effector.

15 Claims, 10 Drawing Sheets

RECONFIGURABLE END-EFFECTORS WITH ARTICULATING FRAME AND INDEXABLE MASTER BOOM

CROSS REFERENCE TO RELATED APPLICATIONS

This application claims the benefit of U.S. Provisional Application No. 61/120,368, filed on Dec. 5, 2008, which is incorporated herein by reference.

TECHNICAL FIELD

This disclosure is related to end-effectors for use with a robotic arm.

BACKGROUND

Known end-effectors attached to robotic apparatuses are used to manipulate a workpiece during manufacturing processes. An end-effector can grasp a workpiece using tool modules, transport the workpiece to a new location, and orient and release the workpiece. The end-effector is preferably adjustable to permit utilization with workpieces of multiple designs, including adjusting the tool modules. It is known to adjust an end-effector for utilization with workpieces of multiple designs by manually adjusting tool modules of the end-effector. Manually adjusting the tool modules of the end-effector is known to consume time and can be prone to errors. Applications of robotic apparatuses with end-effectors can encompass material handling, manufacturing, packaging, and testing.

Known workpieces handled by an end-effector include parts or sheet metal panels that are shaped in three dimensional forms and have large changes of slope and elevation. It can be impractical to design an end-effector with excessively large height extension and swivel angle for tool modules that self-conform to a workpiece.

An end-effector is connected to a robotic arm with a master boom and adapter to move a workpiece into and out of an associated processing station such as a stamping machine and dies. With limited die opening and three dimensional die shapes, a flat end-effector frame with a straight boom may interfere with the dies and machine frames during movement of the workpiece.

End-effectors include tool modules having dress packages that house and route vacuum hoses and electric conduits. The hoses and electric cables are conduits for compressed air, hydraulic fluids, and electricity to actuate devices, e.g., vacuum cups and mechanical grippers mounted on their ends. Known dress packages are tie-wrapped or otherwise attached onto the frame of the end-effector. A change or reconfiguration of a tool module on an end-effector requires releasing the tie-wraps to effect such a change. Other known dress packages for tool modules mounted on end-effectors include the hoses loosely held with some slackness for adjustment or movement of gripping components. Hoses and power cables designed to permit a wide range of motion of one of the tool modules can tangle and interfere with other hoses and power cables. Issues related to dress packaging include permitting setup flexibility for the end-effector and the tool modules, uninterrupted mobility of the end-effector during operation, machine setup time during reconfiguration for a workpiece, and maintainability during life of the equipment.

SUMMARY

An end-effector attachable to a robotic arm for interacting with a workpiece includes an articulating frame mechanically coupled to a master boom which includes a straight boom coupled to an offset boom. The articulating frame includes a fixed pane hingedly coupled to a rotating pane. The rotating pane is adjustable to and lockable at an angular position relative to the fixed pane. The fixed pane is mechanically coupled to the straight boom. The articulating frame and the straight boom are rotatable around a longitudinal axis of the straight boom and relative to the offset boom. A tool module mounted on the articulating frame includes an end element interacting with the workpiece. A flexible conductor is coupled to the tool module, and a flexible dress package includes a flexible cable carrier routing the flexible conductor to the tool module. The end element is operatively connected to a controllable power source via the flexible conductor.

BRIEF DESCRIPTION OF THE DRAWINGS

One or more embodiments will now be described, by way of example, with reference to the accompanying drawings, in which.

DETAILED DESCRIPTION

Figure 1:
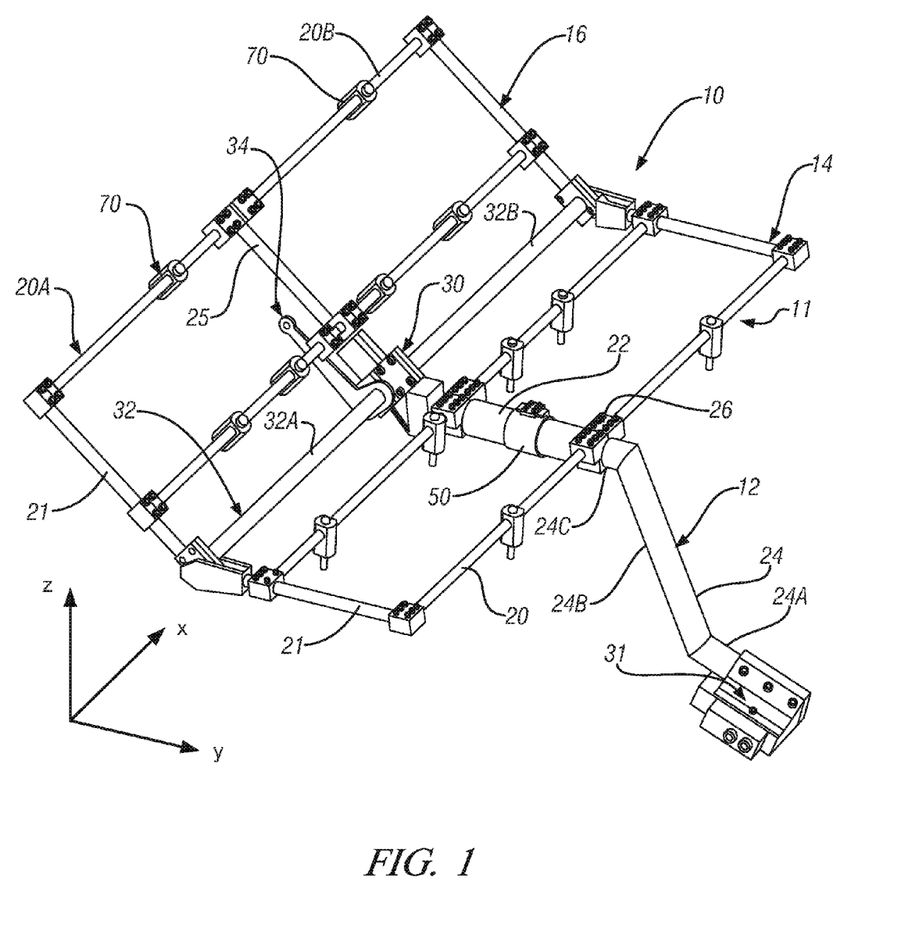
FIG. 1 schematically illustrates an end-effector attachable to a free end of an articulable robotic arm including a plurality of tool modules configured to interact with a workpiece in accordance with the present disclosure.

Referring now to the drawings, wherein the showings are for the purpose of illustrating certain exemplary embodiments only and not for the purpose of limiting the same, FIG. 1 schematically illustrates an end-effector 10 including a plurality of tool modules 70. The end-effector 10 can be machine-configured to a preferred configuration permitting the plurality of tool modules 70 to interact with a workpiece. The end-effector 10 preferably attaches to a free end of an articulable robotic arm 100, or another material handling device. The robotic arm 100 includes a programmable device fixed to a base and operative to linearly and rotationally translate the end-effector 10 in space. A spatial coordinate system described with reference to an x-y-z coordinate system provides a reference coordinate system for the end-effector 10 and the attached tool modules 70.

The end-effector 10 includes an articulating frame 11 coupled to an indexable master boom 12 that connects to the robotic arm 100 using an adaptor 31. The indexable master boom 12 includes a straight boom 22 and an offset boom 24. The articulating frame 11 includes a fixed pane 14 and a movable pane 16, both which are preferably rectangularly-shaped in one embodiment. The fixed pane 14 and the movable pane 16 are fabricated from a plurality of parallel tubing elements 20 that are connected at their ends using end tubing elements 21. The outer tubing element 20 is depicted as segments 20A and 20B, which are divided by a support segment 25 of the movable pane 16 extending collinearly from the straight boom 22. The tubing elements 20 are preferably orthogonal to the straight boom 22 of the master boom 12. The fixed pane 14 is coupled to the movable pane 16 using a rotating shaft 32 that forms a hinge joint therebetween, and includes a lockable clutch assembly 30. The movable pane 16 articulates relative to the fixed pane 14 along the rotating shaft 32 to achieve a convex articulated position (as shown), a concave articulated position and an unarticulated or flat position. One or more tool modules 70, each preferably having five d.o.f., slides on one of the tubing elements 20 of one of the fixed pane 14 and the movable pane 16. The tubing elements 20 act as guide rails for the attached tool modules 70. Each tool module 70 and corresponding tubing element 20 are preferably indexed to prevent rotation of the tool module 70 about a longitudinal axis of the tubing element 20. Each tool module 70 includes a controllable locking mechanism that secures the tool module 70 into a preferred location along the length of the tubing element 20, the preferred location circumscribed by a range of allowable travel between the support segment 25 and a corresponding one of the end tubing elements 21.

The tool module 70 can be reconfigured for picking and placing different workpieces having different geometries by translating along the tubing element 20, as described herein. The fixed tubing pane 14 attaches to the straight boom 22 of the master boom 12 using at least one bracket 26. An indexable device 50 is configured to indexably rotate the fixed and movable panes 14 and 16 connected to the straight boom 22 relative to the offset boom 24 to one of a plurality of predetermined fixed locations.

The offset boom 24 is a tubular device having a first element 24A conjoined at one end to an end of a second element 24B that is conjoined at an opposite end to a third element 24C. In one embodiment, the first element 24A has a longitudinal axis that is orthogonal to the adaptor 31 and projects outwardly therefrom. The second element 24B has a longitudinal axis that is oblique to the longitudinal axis of the first element 24A and projects outwardly therefrom. The third element 24C has a longitudinal axis that is oblique to the longitudinal axis of the second element 24B. Those skilled in the art appreciate that the third element 24C can be either parallel or oblique to the longitudinal axis of the first element 24A, depending upon the application.

Figure 2:
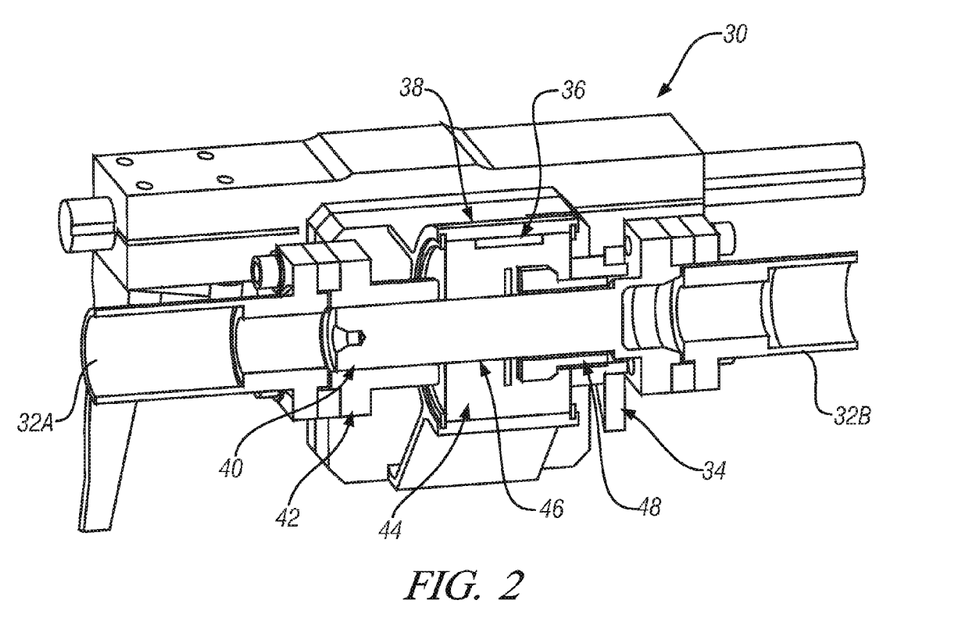
FIG. 2 schematically illustrates an embodiment of a lockable clutch assembly and associated rotating shaft for articulating a movable pane relative to a fixed pane of an articulating frame in accordance with the present disclosure.

FIG. 2 shows an embodiment of the lockable clutch assembly 30 and associated rotating half shafts 32A and 32B of rotating shaft 32 to articulate the movable pane 16 relative to the fixed pane 14 along the rotating shaft 32 to form one of the convex articulated position (as shown), the concave articulated position and the unarticulated or flat position. The lockable clutch assembly 30 includes a bi-directional reverse-locking clutch device 44 having a through-shaft 40 that forms the hinge joint between the fixed pane 14 and the movable pane 16. One skilled in the art understands design features associated with the bi-directional reverse-locking clutch device 44. The through-shaft 40 is keyed to an output portion 46 of the lockable clutch assembly, and a body 36 of the lockable clutch assembly 30 is keyed to a mounting bracket 38. The mounting bracket 38 is fixedly attached to an end of the straight boom 22. An output hub 42 is keyed to an end of the through-shaft 40. An input lever 34 is connected to an input hub 48 of the lockable clutch assembly 30. The angular positioning of the movable pane 16 relative to the fixed pane 14 is adjustable by moving the input lever 34 to rotate the input hub 48 around the through-shaft 40 in either a clockwise or counter-clockwise direction, thus moving the movable pane 16. The lockable clutch assembly 30 locks the angular position of the hinged movable pane 14 into position relative to the fixed pane 16 subsequent to any adjustment achieved by moving the input lever 34.

Figure 3:
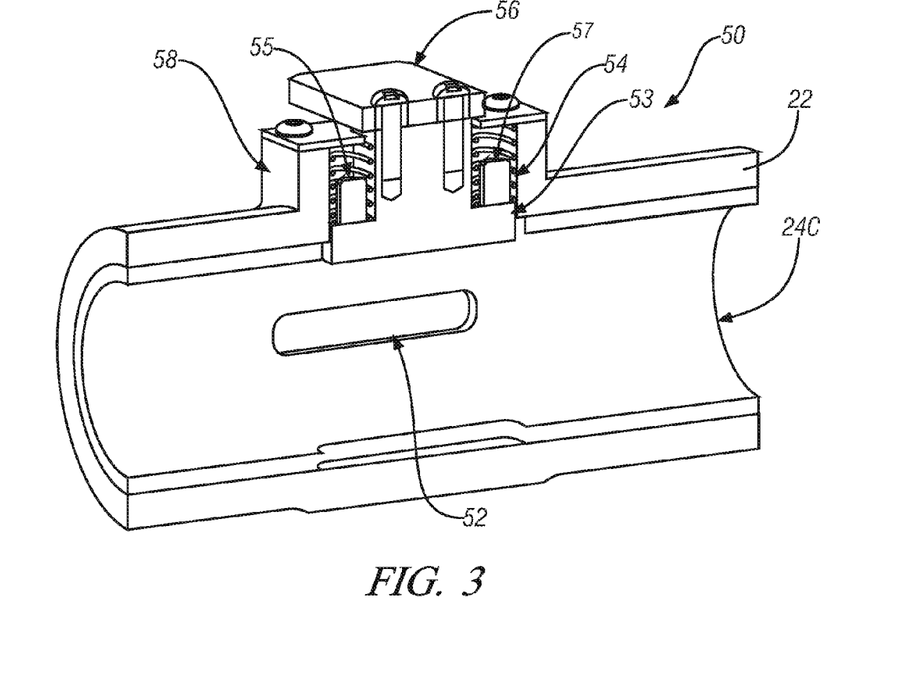
FIG. 3 schematically illustrates an embodiment of an indexable device configured to permit an articulating frame connected to a straight boom to indexably rotate at preset intervals relative to an offset boom in accordance with the present disclosure.

FIG. 3 shows a first embodiment of the indexable device 50 configured to permit the articulating frame 11 connected to the straight boom 22 to indexably rotate at preset intervals relative to the third element 24C of the offset boom 24. The fixed pane 14 of the articulating frame 11 is fixedly connected to the straight boom 22. The third element 24C of the offset boom 24 is coaxial to and inserted into the straight boom 22, and configured to permit the articulating frame 11 and the straight boom 22 to rotate around the third element 24C. The third element 24C of the offset boom 24 includes a plurality of key slots 52 located radially at preset intervals or positions. In one embodiment, there are four key slots 52 each radially located in the third element 24C at preset intervals of 90° of rotation. The indexable device 50 includes a machined bracket 58 that houses a key 53 that is spring-loaded with compression springs 54. The key 53 aligns with the plurality of key slots 52. To index and lock the rotational position of the straight boom 22 and the articulating frame 11 to the offset boom 24, the key 53 is disengaged from the key slot 52 and the straight boom 22 is rotated on the offset boom 24 until one of the key slots 52 is aligned with the key 53, allowing the spring-loaded key 53 to engage the key slot 52. The spring-loaded key 53 is disengaged from the key slot 52 by pulling up on a release plate 56 attached to the spring-loaded key 53, thus unlocking the offset boom 24 from the straight boom 22 and permitting rotation therein. Stop pins 55 and 57 are located within each compression spring 54 and limit radial movement of the key 53 thereby preventing the compression springs 54 from being overcompressed.

Figure 4A:
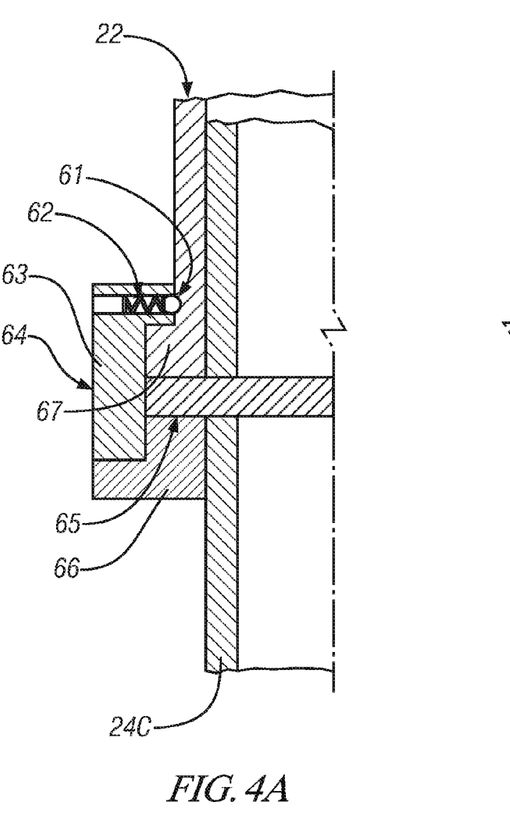
FIGS. 4A, 4B, 5, and 6 schematically illustrate another embodiment of an indexable device configured to permit an articulating frame connected to a straight boom to indexably rotate at preset intervals relative to an offset boom in accordance with the present disclosure.
Figure 4B:
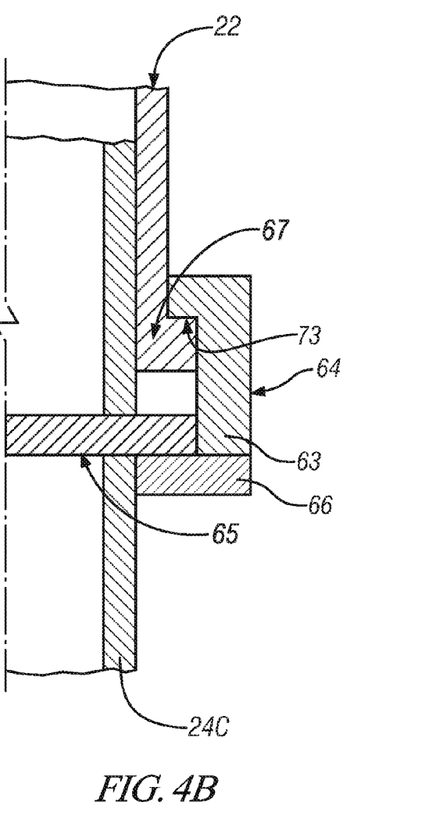
Figure 5:
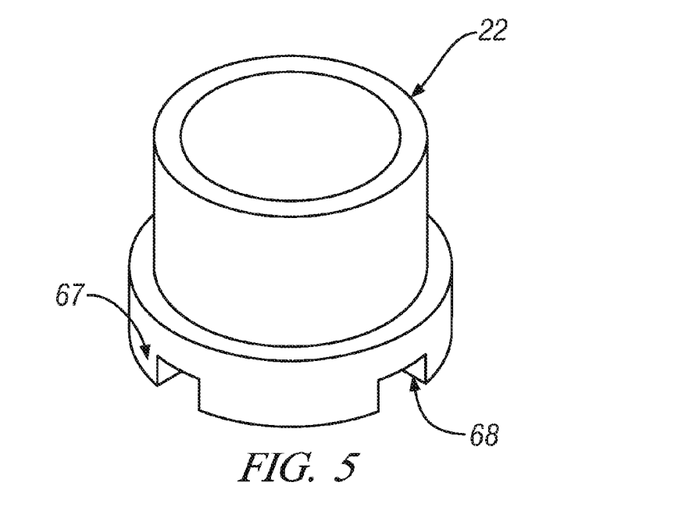
Figure 6:
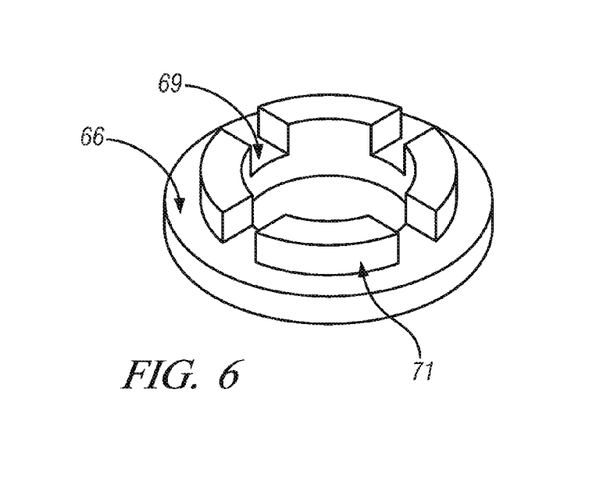

FIGS. 4A, 4B, 5, and 6 schematically illustrate an embodiment of an indexable device configured to permit an articulating frame connected to a straight boom 22 to indexably rotate at preset intervals relative to the offset boom 24. FIGS. 4A and 4B are partial sectional schematic views of a mechanism for rotating and indexing the straight boom 22 relative to the offset boom 24. FIG. 5 schematically shows an end of the straight boom 22 including a flange 67 having a plurality of slots 68 radially placed therein. FIG. 6 schematically shows the offset boom 24 having a flanged cap 66 that includes an inner ring 71 having a plurality of slots 69. A desired locking/unlocking position of the straight boom 22 and the offset boom 24 can be secured by a spring-loaded plunger 62 in the flanged open ring 63 and at least one detent 61 on the straight boom 22.

The partial sectional schematic view of FIG. 4A includes the straight boom 22, the third element 24C of the offset boom 24, and flange 67 having slots 68 and the flanged cap 66. There is a two-piece latching ring assembly 64, including a flanged open ring 63 and the flanged cap 66 bolted together. A dowel pin 65 pierces through the offset boom 24. The dowel pin 65 is the same size so as to fit into one of or a pair of the slots 68 on the straight boom 22. A flange portion 73 of the open ring 63 is always in contact with the flange 67 of the straight boom 22. The slots 69 of the inner ring 71 of the flanged cap 66 match the slots 68 on the flanged end 67 of the straight boom 22. As shown in FIG. 4A, the two sets of slots 68 and 69 are misaligned, with the pin 65 of the offset boom 24 trapped in the slots 68 of the straight boom 22. Thus, the angular orientation between the offset boom 24 and the straight boom 22 is locked.

The partial sectional schematic view of FIG. 4B includes the straight boom 22, the third element 24C of the offset boom 24, and flange 67 having slots 68 and the flanged cap 66. The latching ring 64 has been rotated to allow the slots 68 and 69 to align and to allow the pin 65 and the offset boom 24 to move. When the pin 65 is only in the slots 69 of the flanged cap 66, as shown, the offset boom 24 and its pin 65 are free to rotate to another pair of slots 68 on the straight boom 22. When the slots 68 and 69 are aligned again, the angular indexing is completed by axially moving the pin 65 back into the slots 68 on the straight boom 22 and then rotating the latch ring 64 to misalign the two sets of slots 68 and 69 to lock the straight boom 22 and the offset boom 24 together.

Figure 7:
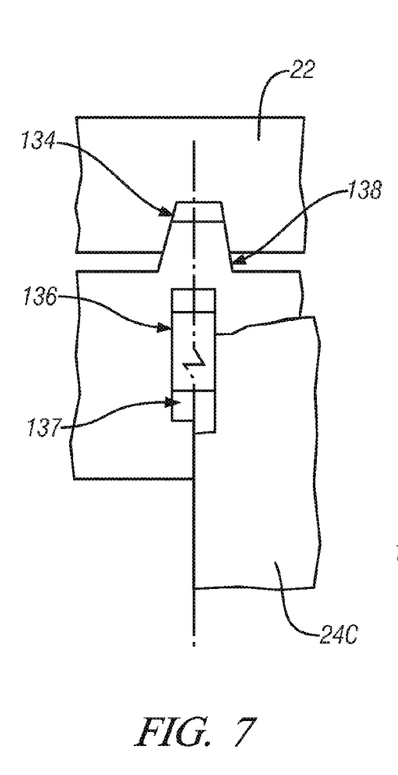
FIGS. 7 and 8 schematically illustrate another embodiment of an indexable device configured to permit an articulating frame connected to a straight boom to indexably rotate at preset intervals relative to an offset boom in accordance with the present disclosure.
Figure 8:
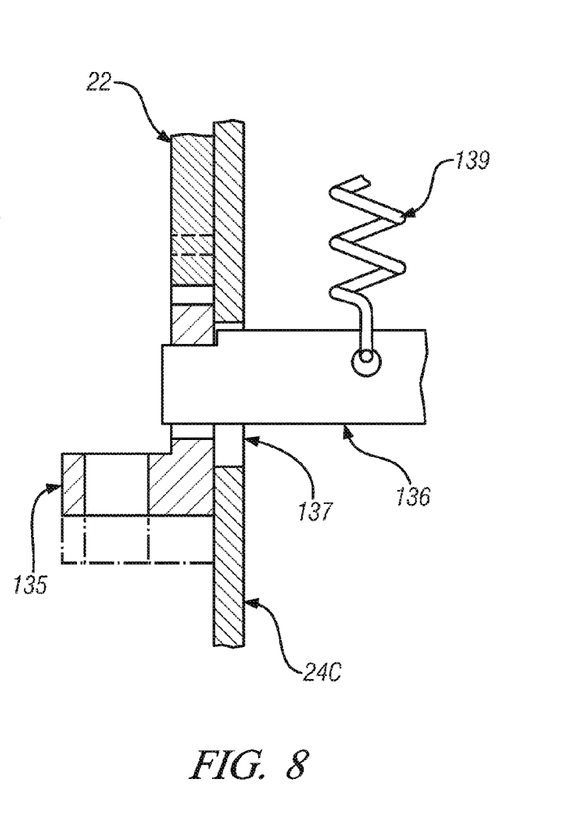

FIGS. 7 and 8 show a third embodiment of a mechanism for rotating and indexing the master boom 12. The straight boom 22 includes indexing slots 134 at one end, a locking collar 135, and a spring-loaded rectangular pin 136. The offset boom 24 includes a pair of straight-through elongated holes 137. The locking collar 135 has at least one latch key 138 that can be fit into one of the indexing slots 134 on the straight boom 22. The rectangular pin 136 couples the locking collar 135 to the offset boom 24. The straight boom 22 and the offset boom 24 are thus locked together rotationally. An extension spring 139 having one end fixed to the offset boom 24 and the other end fixed to the rectangular pin 136 ensures the straight boom 22 and the offset boom 24 remain locked. A taper on both the indexing slots 134 and the latch key 138 minimizes clearance play. The rectangular pin 136 is notched on both ends to trap it radially within the offset boom 24. To unlock the offset boom 24 from the straight boom 22, the locking collar 135 is pushed axially to slide the key 138 out of engagement with the slot 134 on the straight boom 22. The straight boom 22 can then be rotated along with the rectangular pin 136 and the offset boom 24 to the next slot and released to lock again.

Figure 9:
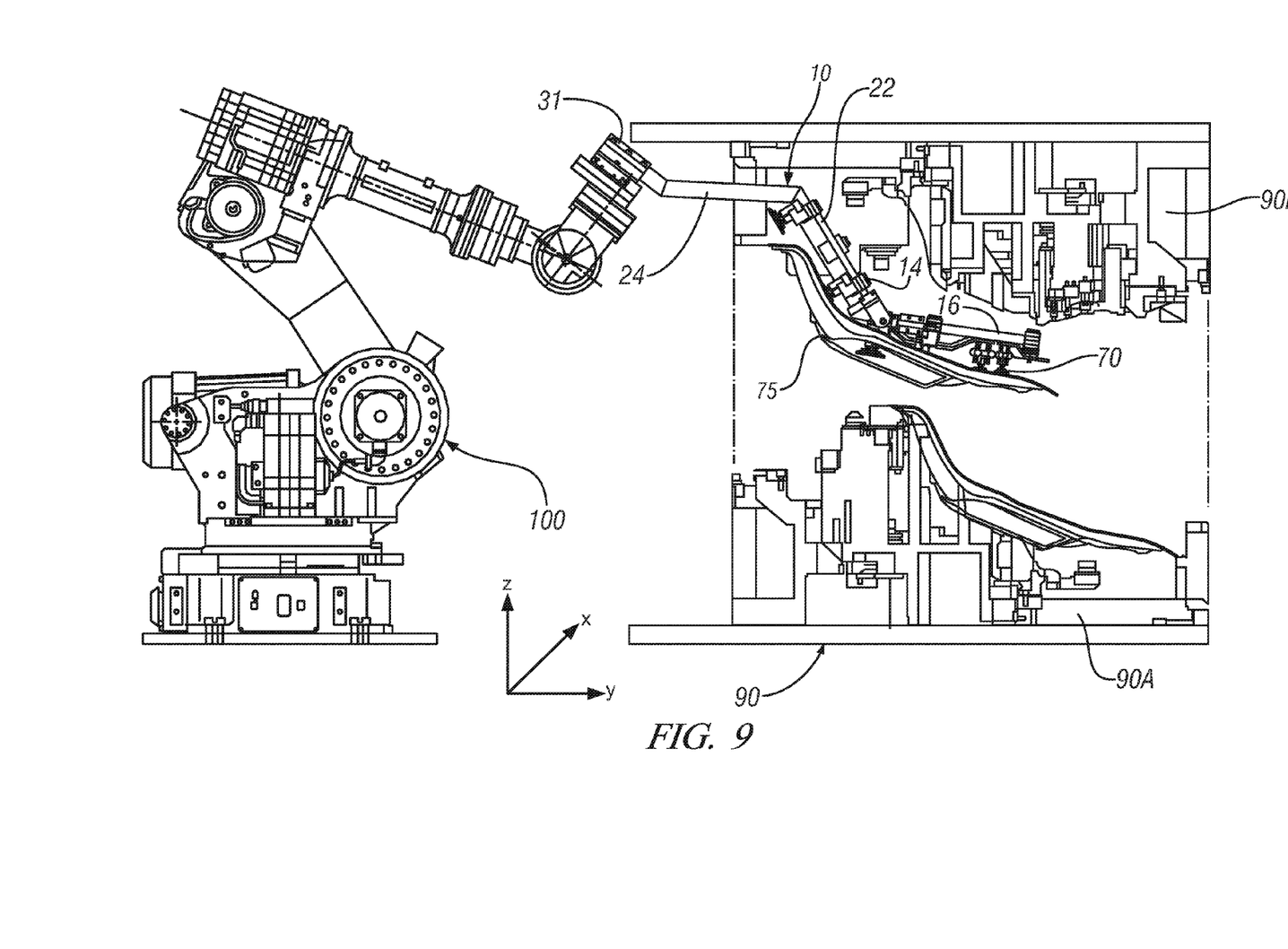
FIG. 9 schematically illustrates an exemplary end-effector coupled to a free end of an articulable robotic arm in proximity to a stamping machine including die elements in accordance with the present disclosure.

FIG. 9 shows an exemplary end-effector 10 coupled to a free end of an articulable robotic arm 100 in proximity to a stamping machine 90 including die elements 90A and 90B. The robotic arm 100 includes a programmable robotic device fixed to a base and operative to linearly and rotationally translate the end-effector 10 in space. The spatial coordinate system including the x-y-z coordinate system provides the reference coordinate system for the end-effector 10 and attached tool modules 70. The end-effector 10 attaches to a workpiece 75 using the tool modules 70. As shown, the movable pane 16 and the fixed pane 14 of the articulating frame 11 are formed into the convex articulated position. This allows the workpiece 75 to be moved in or out of the die elements 90A and 90B without interference.

Figure 10:
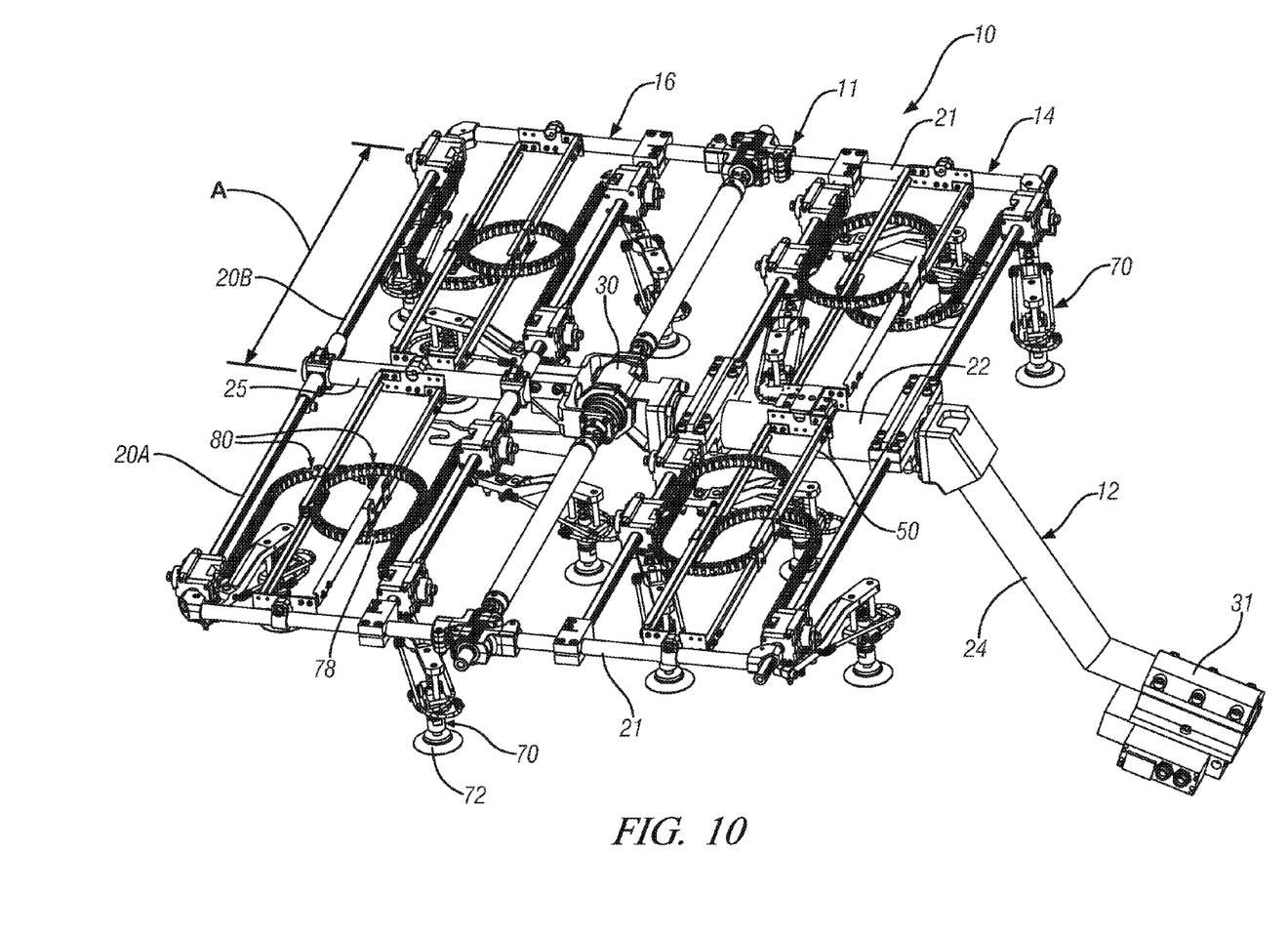
FIG. 10 schematically illustrates a reconfigurable end-effector including a plurality of tool modules and an associated plurality of flexible dress packages in accordance with the present disclosure.

FIG. 10 shows the reconfigurable end-effector 10 including a plurality of tool modules 70 and an associated plurality of flexible dress packages 80. The reconfigurable end-effector 10 includes the adaptor 31, the indexable master boom 12 with the straight boom 22 and the offset boom 24, the fixed pane 14 and the movable pane 16, the lockable clutch assembly 30, and the indexable device 50. Each reconfigurable end-effector 10 has an end element 72 that interacts with the workpiece. The end element 72 connects to a controllable power source via a flexible conductor 78 that is routed through the flexible dress package 80. The controllable power source preferably originates in and is controlled by the robotic arm 100, or alternatively through some other convenient location. The end element 72 may include a swivelable vacuum cup device in one embodiment that connects to a controllable vacuum source via a flexible conductor 78 that includes an air hose. Alternatively, the end element 72 may include an actuable gripper device that connects to a controllable electrical source via a flexible conductor 78 that includes an electrical conductor. Alternatively, there can be other tool module(s) 70 for the end-effector 10, including ones using another convenient power source for actuation power. The flexible dress package 80 provides flexibility for re-positioning or reconfiguring each of the tool modules 70. A range of allowable travel designated by the letter A is associated with one of the end-effectors 10 along a length of one of the tubes 20 between the support segment 25 and the corresponding one of the end tubing elements 21, and is shown for one of the tool modules 70.

Figure 11:
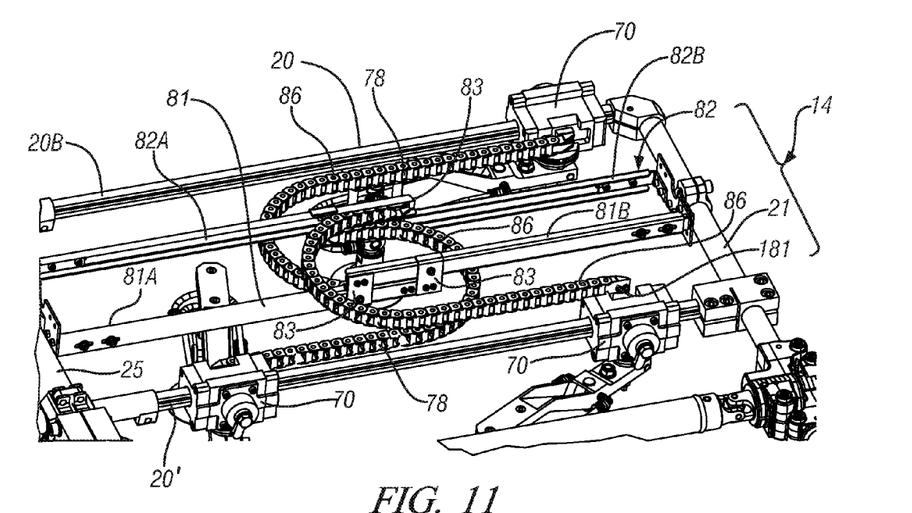
FIG. 11 schematically illustrates an exemplary portion of a moveable pane of a reconfigurable end-effector including three tool modules and a corresponding plurality of dress packages in accordance with the present disclosure.

FIG. 11 shows an exemplary portion of the moveable pane 14 of the reconfigurable end-effector 10 including three tool modules 70 and a corresponding plurality of dress packages 80. The moveable pane 14 of the end-effector 10 includes the outer tubing element 20B with one tool module 70 slidably mounted thereon and an inner tubing element 20' with two tool modules 70 slidably mounted thereon. An inner channel rail 81 and an outer channel rail 82 run parallel to and between the outer and inner tubing elements 20 and 20', and connect to and between the support segment 25 and the opposed end tubing element 21. The inner channel rail 81 and the outer channel rail 82 each includes a first rail portion 81A and 82A, respectively and a second rail portion 81B and 82B, respectively. The corresponding first and second rail portions 81A and 81B and 82A and 82B respectively, overlap and connect at halfway points. The first and second rail portions 81A and 81B and 82A and 82B respectively, each include an inner end 83 that connects to a first end of a flexible cable carrier 86. A second end of the flexible cable carrier 86 connects to one of the tool modules 70. The first and second rail portions 81A and 81B and 82A and 82B and the flexible cable carrier 86 are arranged such that each flexible cable carrier 86 rides against one of the first and second rail portions 81A and 81B and 82A and 82B. The flexible conductor 78 is routed through the flexible cable carrier 86 to the associated one of the first and second rail portions 81A and 81B and 82A and 82B which connects to the controllable power source via the indexable master boom 12 that connects to the robotic arm 100 using the adaptor 31. Preferably there is a connector fitting 181 at the second end of each flexible cable carrier 86 connecting to one of the tool modules 70. The connector fitting 181 provides a connector terminus for the flexible conductor 78, and provides a disconnectable connection to the tool module 70. The flexible cable carrier 86 and associated first and second rail portions 81A and 81B and 82A and 82B allow the flexible conductor 78 to bend and move in a well defined path when the tool module 70 is moved during reconfiguration. Each tool module 70 can achieve the full range of allowable travel A along the length of tube 20. The length of the flexible conductor 78 and the flexible cable carrier 86 is minimized when the fixed end of the flexible cable carrier 86 is mounted to the one of the first and second rail portions 81A and 81B and 82A and 82B at the middle of the range of travel A of the tool module 70.

As shown, one of the tool modules 70 is configured to slide on the outer frame rail 20 and two of the tool modules 70 are configured to slide on the inner frame rail 20'. Two of the channel rails 81A and 82B and respective flexible cable carriers 86 are arranged on the same plane, and another of the channel rails 82A and 82B and respective flexible cable carrier 86 is arranged slightly above so as not to interfere with the channel rails 81A and 82B and respective flexible cable carriers 86. The use of half-length channel rails 81A and 82B permits using channel rails 81A and 82B mounted in the same plane in such a way that they extend from the opposite ends of the selected quadrant for the articulating frame 11 of the end-effector 10, i.e., between the support segment 25 and the end tubing element 21, which allows them to cross into adjoining traveling zones for the flexible cable carrier 86 and flexible conductor 78 without interference. This arrangement affords sufficient space for the flexible cable carriers 86 and flexible conductors 78 to bend at larger radii and avoid bulging, which may cause interference with other components on the end-effector 10. All the flexible conductors 78 and flexible cable carriers 86 can move smoothly and orderly without entangling each other or other end-effector components.

Figure 12:
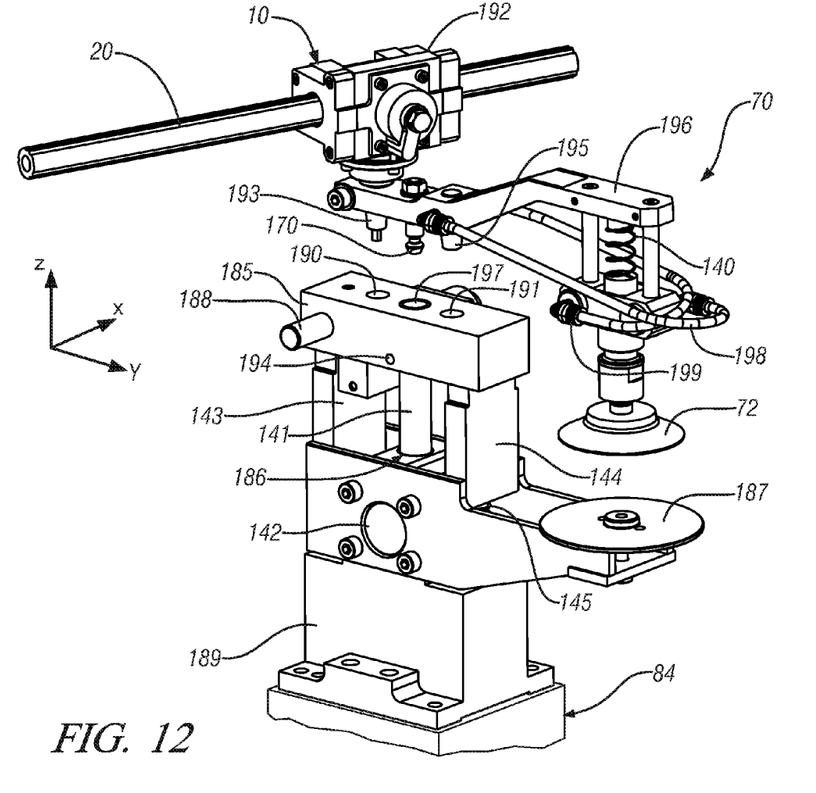
FIG. 12 schematically illustrates an exemplary tool module of a reconfigurable end-effector and an associated engage-once setup tool for achieving a preferred position and orientation of an end element of the tool module in accordance with the present disclosure.

FIG. 12 shows a portion of an exemplary end-effector 10 including tubing element 20 that acts as a mounting structure and guide rail for an attached tool module 70. The tool module 70 includes the end element 72, which is the swiveleable vacuum cup 72 mounted on a swing arm 196. The reference x-y-z coordinate system is shown. As shown, the tool module 70 is configured to engage an engage-once setup tool 84 to achieve a preferred position and orientation of the end element 72, in this embodiment a vacuum cup 72. A latching post 170 on the tool module 70 is insertable into a corresponding latch opening 197 on the setup tool 84. The setup tool 84 includes a spring-loaded engagement head 185, a lockable rod slide 186, a cup pad 187, an articulation pin 188 and a base 189 for the aforementioned components to mount on and engage with the robotic arm 100. The engagement head 185 has a centering hole 190, a driving hole 191, and the latch opening 197. The tool module 70 fixedly connects to the setup tool 84 by inserting a hollow rotary shaft 193, the latching post 170, and a nipple 195 into the corresponding centering hole 190, latching opening 197, and driving hole 191 of the engagement head 185 of the setup tool 84 and fixedly locking the latching post 170. The centering hole 190 locks and unlocks the integrated linear-rotary locking assembly 192 through its engagement with the hollow rotary shaft 193 of the integrated locking assembly 192. At engagement, compressed air can be injected through a pneumatic fitting hole 194 to the centering hole 190 and the rotary shaft 193 to unlock linear and rotary joints contained inside the integrated locking assembly 192. The robotic arm 100 with the simultaneous engagement of the driving hole 191 to the nipple 195 of the swing arm 196 of the tool module 70 can slide and rotate the tool module 70 on the tubing element 20 to reposition the tool module 70 and the vacuum cup 72 along the x and y axes.

Compressed air can be simultaneously injected through a driving hole 191, associated nipple 195 and air hoses 198 to release linear locks 199 preferably similar to the linear portion of tool module 70 that hold the Z-position of the vacuum cup 72. Once unlocked, a compression spring 140 pushes the vacuum cup 72 to its fully-extended length in the z-direction until the vacuum cup 72 touches a cup pad 187 of the setup tool 84. The engagement head 185 is fixed to a lockable rod slide 186, which includes a sliding shaft 141 and a pneumatic-actuated linear lock 142, which are preferably similar to the linear portion of tool module 70 on the tool module 70 and are mounted on the base 189. On both ends of the engagement head 185 are two spring-loaded guide posts 143 and 144 to keep the engagement head 185 from rotating. A compression spring 145 in each of the guide posts 143 and 144 allows the engagement head 185 to be extended or compressed to any desired extension from the base 189 when the rod slide 186 is not locked. The extension range of the engagement head 185 needs to be at least the same as that of the vacuum cup 72 to ensure both the centering and the driving holes 190 and 191, respectively, engage with the tool module 70 before the vacuum cup 72 is released to contact the cup pad 187. With compressed air on, the rod slide 186 is unlocked, the engagement head 185 is in contact with the tool module 70, the vacuum cup 72 is released to touch the cup pad 187, the robotic arm 100 is controlled to push the vacuum cup 72 through the setup tool 84 and move the cup pad 187 to an updated Z-position. After that, compressed air is released to secure the XYZ position of the vacuum cup 72, and the robotic arm 100 can disengage the setup tool 84 from the tool module 70. The setup tool 84 can proceed to reconfigure another of the tool modules 70.

Figure 13:
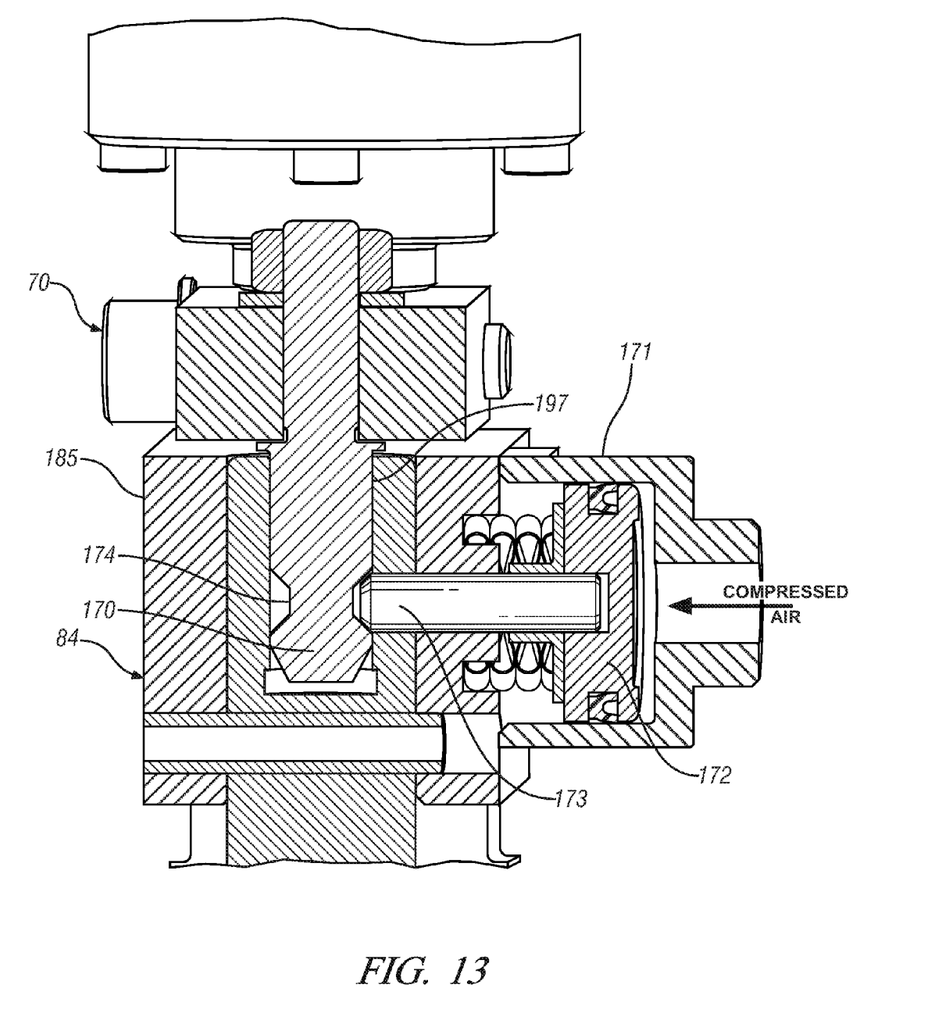
FIG. 13 schematically illustrates a portion of an exemplary tool module of a reconfigurable end-effector engaged to an engage-once setup tool in accordance with the present disclosure.

FIG. 13 schematically illustrates a portion of the tool module 70 engaged to the spring-loaded engagement head 185 of the setup tool 84. The latching post 170 inserts into the latching opening 197 of the setup tool 84, which includes a pneumatically actuated latching assembly 171. After insertion of the latching post 170 and a corresponding engagement of the centering hole 190 to the hollow rotary shaft 193, compressed air is injected to the latching assembly 171 to push a spring-loaded piston 172 and pin 173 to latch on the latching post 170 at nutch 174. This action fixedly attaches the tool module 70 to the setup tool 84 so long as the compressed air is maintained to the latching assembly 171. This prevents disengagement of the setup tool 84 with the integrated locking assembly 192 that may result from any reaction force occurring when compressed air is injected through the centering hole 190 to the hollow rotary shaft 193. The latching assembly 171 secures the tool module 70 to the setup tool 84 during setup for configuring of the tool module 70 to a new position.

Figure 14:
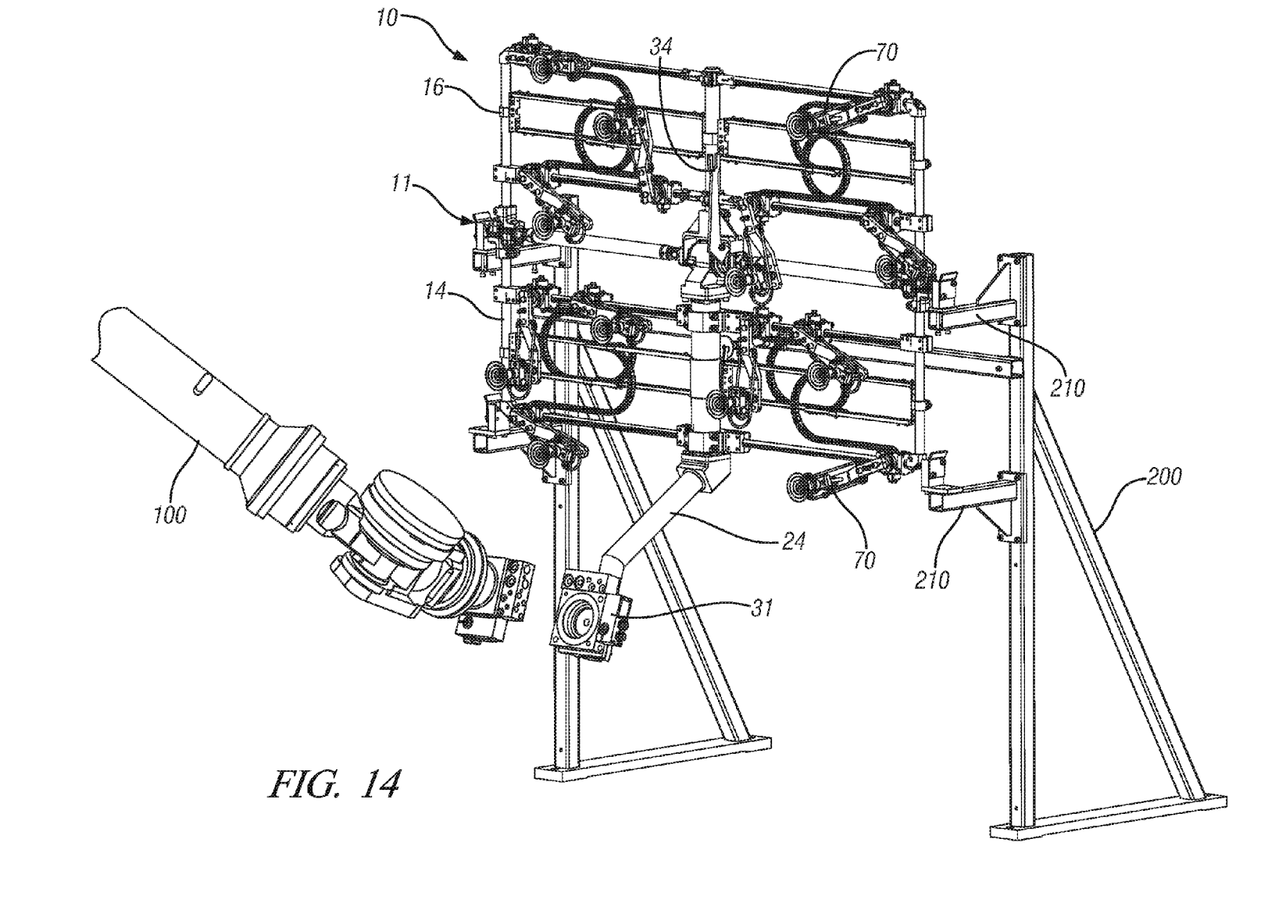
FIG. 14 schematically illustrates a portion of a robotic arm and an exemplary end-effector mounted on a setup stand in accordance with the present disclosure.
Figure 15:
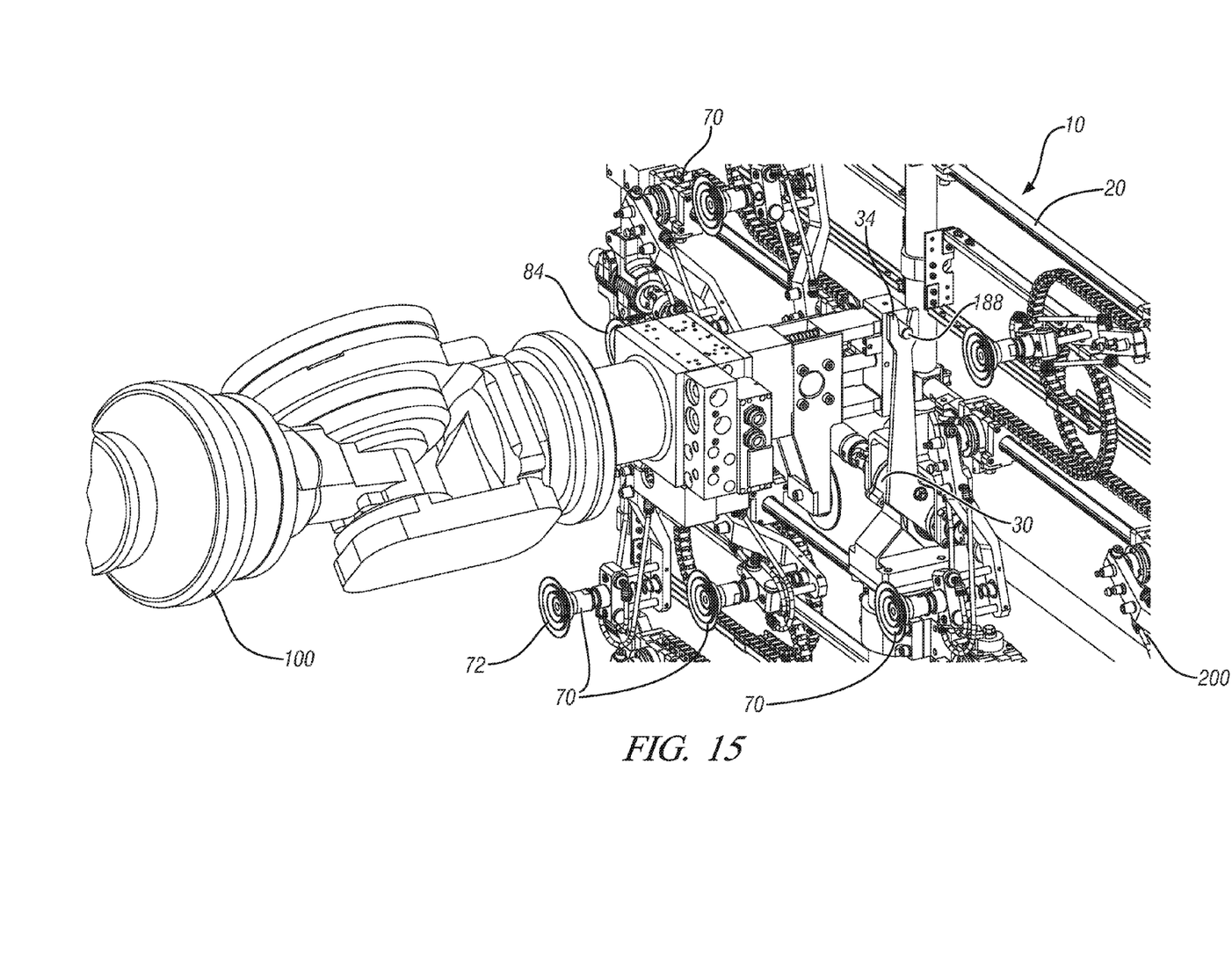
FIG. 15 schematically illustrates a portion of a robotic arm including a setup tool interacting with an exemplary end-effector mounted on a setup stand in accordance with the present disclosure.

FIG. 14 and FIG. 15 show a portion of the robotic arm 100 and an exemplary end-effector 10 mounted on a setup stand 200. The setup stand 200 is preferably floor mounted and includes a plurality of hook elements 210. The reconfigurable end-effector 10 has been previously described and preferably includes the adaptor 31, the indexable master boom 12 with the straight boom 22 and the offset boom 24, and the articulating frame 11 including the fixed pane 14 and the movable pane 16 and a plurality of reconfigurable tool modules 70. Preferably portions of the reconfigurable end-effector 10 can be mounted onto the hook elements of the setup stand 200.

A special robotic setup tool and process permitting the robotic arm 100 to reconfigure or reposition each tool module 70 with a single engagement is described. The swivelable vacuum cup 72 is self-adaptable to workpiece geometry and does not need to be locked, the setup process only reconfigures the tool module 70 in three d.o.f. or axes, i.e., the reference x-y-z coordinate system. At the same time, for the articulation of the end-effector frame, the setup tool 84 includes a design feature to perform articulation of the movable pane 16 relative to the fixed pane 14 without the need of another setup tool. A complete reconfiguration process for the end-effector 10, including indexing of the master boom 12 is described.

FIG. 14 shows a portion of the robotic arm 100 including the setup tool 84 that is interacting with an exemplary end-effector 10 mounted on setup stand 200. The end-effector 10 includes the articulating frame 11 with the fixed pane 14 and the movable pane 16 and a plurality of tool modules 70. The angular positioning of the movable pane 16 relative to the fixed pane 14 is adjustable by moving the input lever 34 and the associated rotating shaft 32 in either a clockwise or counter-clockwise direction. The angular position of the fixed pane 14 relative to the movable pane 16 is locked using the lockable clutch assembly 30. The setup tool 84 includes the articulation pin 188 that engages the input lever 34 to move the input lever 34 to articulate the angular position of the movable pane 16 relative to the fixed pane 14 to a preferred position.

Articulation of the movable pane 16 relative to the fixed pane 14 and indexing the master boom 12 can be performed manually or using an automated operation. For the automated operation, the whole end-effector 10 including the master boom 12 can be securely hung on the setup stand 200. The robotic arm 100 can grab and move the input lever 34 to restore the articulating frame 11 of the end-effector 10 to a flat plane to facilitate the subsequent reconfiguration of the tool module(s) 70. When all the programmed tool module reconfiguration operations are completed, the articulating frame 11 can be articulated to a desired angle, followed by indexing of the master boom 12. The end-effector 10 is reconfigurable for material handling, such as pick-and-place of sheet metal panels in a stamping operation. Each tool module 70 can be configured in five d.o.f.

In operation, the exemplary end-effector 10 can be reconfigured using the robotic arm 100 and the aforementioned setup tool 84, using the following sequence of events. The end-effector 10 can be placed on the setup stand 200, and the robotic arm 100 disconnected from the adaptor 31. The setup tool 84 is picked up and connected to the robotic arm 100, preferably from a tool rest location on the setup stand 200. The lockable rod slide 186 is pneumatically unlocked, and the spring-loaded engagement head 185 is extended to its maximum achievable extension. The lockable rod slide 186 is relocked by releasing compressed air. The articulation pin 188 is manipulated to engage with the input lever 34 to reset the articulating frame 11 to zero articulation. The lockable rod slide 186 is unlocked again. The spring-loaded engagement head 185 is manipulated to contact one of the tool modules 70. Compressed air is injected through the centering hole 190 and the driving hole 191 to unlock the integrated locking assembly 192 and the vacuum cup 72 respectively, allowing the setup tool 84 to slide and swing the tool module 70 to a new XY position of the vacuum cup 72. The setup tool 84 is controlled by the robotic arm 100 to press the vacuum cup 72 to the desired Z position. Compressed air is released to lock the vacuum cup 72 to the new XYZ position and the setup tool 84 is disengaged from the tool module 70. This action can be repeated for each of the plurality of tool modules 70.

Subsequently, the lockable rod slide 186 is pneumatically locked with the spring-loaded engagement head 185 and articulation pin 188 at the full extension. The articulation pin 188 is manipulated to engage with the input lever 34 to set the articulating frame 11 to the desired articulation of the movable pane 16 relative to the fixed pane 14. The setup tool 84 can be parked on the tool rest stand 200. The robot arm 100 is coupled to the master boom 12 of the end-effector 10 at the adaptor 31. An indexable device 50 on the master boom 12, e.g., as described herein, is actuated to indexably rotate the straight boom 22 relative to the offset boom 24.

It is noted that the above process sequence can be automated by a robotic device as illustrated, and can be executed manually by a human operator holding the setup tool 84 with a pneumatic power source and a measurement device providing feedback of the XYZ position of each tool module 70, which can be more efficient than manually setting up the system by adjusting, tightening and part-swapping.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An end-effector attachable to a robotic arm for interacting with a workpiece, comprising:
    an articulating frame mechanically coupled to a master boom, the master boom including a straight boom coupled to an offset boom;
    the articulating frame comprising a fixed pane hingedly coupled to a rotating pane, the rotating pane adjustable to and lockable at an angular position relative to the fixed pane, including a lockable clutch assembly for locking the rotating pane at the angular position relative to the fixed pane and an indexable device connected to the articulating frame and the straight boom;
    the fixed pane mechanically coupled to the straight boom;
    the articulating frame and the straight boom rotatable around a longitudinal axis of the straight boom and relative to the offset boom, the indexable device effecting rotation of the articulating frame and the straight boom to one of a plurality of preset intervals around the longitudinal axis of the straight boom relative to the offset boom;
    a tool module mounted on the articulating frame and including an end element for interacting with the workpiece;
    a flexible conductor coupled to the tool module;
    a flexible dress package including a flexible cable carrier routing the flexible conductor to the tool module; and
    the end element operatively connected to a controllable power source via the flexible conductor.

2. The end-effector of claim 1, wherein the rotating pane is adjustable to an angular position relative to the fixed pane comprising one of a convex articulated position, a concave articulated position and an unarticulated position.

3. The end-effector of claim 1, wherein the offset boom comprises first, second and third conjoined elements, the third conjoined element coaxial to the straight boom, wherein rotation of the articulating frame and the straight boom to one of the plurality of preset intervals around the longitudinal axis of the straight boom is relative to the third conjoined element of the offset boom.

4. The end-effector of claim 1, wherein:
the tool module mounted on the articulating frame comprises the tool module mounted on a tubing element mounted between a support segment and an end tubing element of the articulating frame; and
the flexible dress package routing the flexible conductor to the tool module comprises a channel rail mounted parallel and adjacent to the tubing element, the channel rail comprising overlapping connected first and second rail portions, the first rail portion including an inner end connected to a first end of the flexible cable carrier, and the tool module connected to a second end of the flexible cable carrier.

5. The end-effector of claim 4, wherein the tool module is moveably mounted for translation along the tubing element.

6. The end-effector of claim 1, further comprising;
a hollow rotary shaft, a latching post, and a nipple; and
a setup tool configured to engage the hollow rotary shaft, latching post, and nipple;
wherein the tool module is configured to engage the setup tool to achieve a preferred position and orientation of the end element.

7. The end-effector of claim 6, further comprising the rotating pane including an input lever, said input lever engageable with-the setup tool to achieve a preferred angular position of the rotating pane of the articulating frame relative to the fixed pane, said lockable clutch assembly locking the rotating pane at the preferred angular position relative to the fixed pane.

8. The end-effector of claim 7, further comprising said indexable device configured to indexably rotate the articulating frame and the straight boom around the longitudinal axis of the straight boom and relative to the offset boom.

9. An end-effector attachable to a robotic arm for interacting with a workpiece, comprising:
an articulating frame mechanically coupled to a master boom;
the articulating frame comprising a fixed pane hingedly coupled to a rotating pane, and a lockable clutch assembly;
the rotating pane adjustable to a preferred angular position relative to the fixed pane;
the lockable clutch assembly lockable at the preferred angular position;
the fixed pane mechanically coupled to the master boom;
the articulating frame rotatable around a longitudinal axis of the master boom;
a tool module mounted on a tubing element of the articulating frame and including a configurable end element for interacting with the workpiece; and
a flexible dress package routing a flexible conductor to the tool module.

10. The end-effector of claim 9, wherein the preferred angular position of the rotating pane relative to the fixed pane comprises one of a convex articulated position, a concave articulated position and an unarticulated position.

11. The end-effector of claim 10, further comprising an indexable device connected to the articulating frame, the indexable device effecting rotation of the articulating frame to one of a plurality of preset intervals around the longitudinal axis of the master boom.

12. The end-effector of claim 11, wherein the master boom comprises a straight boom coupled to an offset boom.

13. The end-effector of claim 12, wherein the offset boom includes first, second and third conjoined elements, including the first conjoined element attachable to the robotic arm and the third conjoined element coaxial to and attached to the straight boom attached to the articulating frame.

14. The end-effector of claim 9, wherein the flexible dress package routing the flexible conductor to the tool module comprises a channel rail mounted parallel and adjacent to the tubing element, the channel rail comprising overlapping connected first and second rail portions, the first rail portion including an inner end connected to a first end of a flexible cable carrier, and the tool module connected to a second end of the flexible cable carrier.

15. Method to set up an end-effector attachable to a robotic arm, the end-effector including a tool module comprising an end element configurable to interact with a workpiece, the end-effector including an articulating frame coupled to a master boom device including a straight boom coupled to an offset boom, the articulating frame comprising a rotating pane hingedly rotatably coupled to a fixed pane, the method comprising:
placing the end-effector on a setup stand;
connecting a setup tool to the robotic arm;
manipulating the tool module with the setup tool, including sliding and swinging the tool module to a preferred XY position relative to the articulating frame with the setup tool and pressing the end element of the tool module to a preferred Z position;
engaging an input lever of the articulating frame with the setup tool and hingedly rotating the rotating pane relative to the fixed pane to a preferred articulation angle; and
indexably rotating the straight boom relative to the offset boom.

* * * * *